(No Model.)
A. T. GIFFORD.
MILLING MACHINE.
No. 458,325. Patented Aug. 25, 1891.
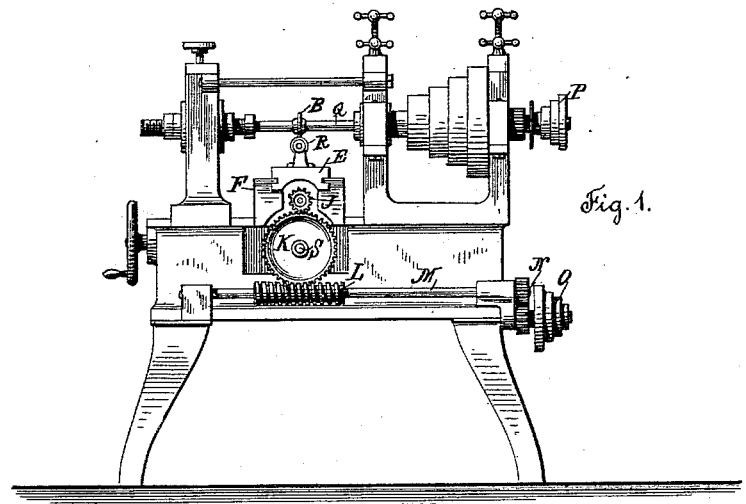
Fig. 1.
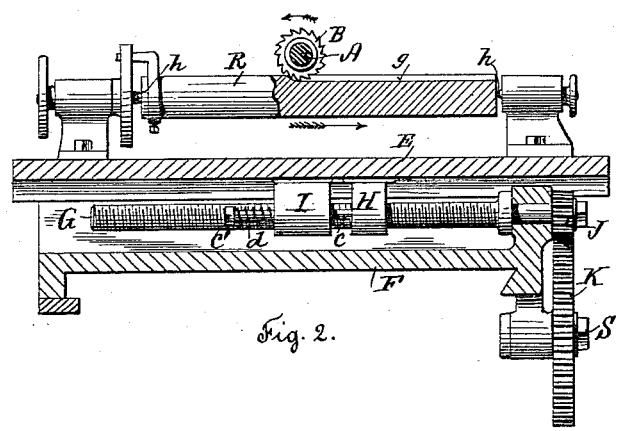
Fig. 2.
Fig. 3.
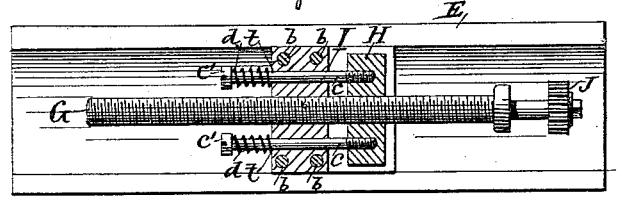
Fig. 4. Fig. 5.
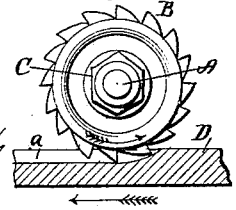
Witnesses
Chas. F. Schmelz
H. E. Reynolds
Inventor
Alonzo T. Gifford,
By his Attorney
S. Scholfield

UNITED STATES PATENT OFFICE.

ALENZA T. GIFFORD, OF HOPEDALE, MASSACHUSETTS.

MILLING-MACHINE.

SPECIFICATION forming part of Letters Patent No. 458,325, dated August 25, 1891.

Application filed November 10, 1890. Serial No. 370,968. (No model.)

*To all whom it may concern:*

Be it known that I, ALENZA T. GIFFORD, a citizen of the United States, and a resident of Hopedale, in the county of Worcester and State of Massachusetts, have invented an Improvement in Milling-Machines, of which the following is a specification.

The nature of my invention consists in the improved combination, with the rotary cutter, of the supporting-table and means for operating the table without backlash, as hereinafter fully set forth.

Figure 1 is a milling-machine embodying my invention. Fig. 2 is a central longitudinal section of the work-supporting table and sliding block for the table. Fig. 3 represents a bottom view of the table, partly in section. Figs. 4 and 5 are views, partly in section, illustrating the proper action of a revolving cutter in performing its work.

In the accompanying drawings, Figs. 4 and 5, A is the cutter-arbor of a milling-machine, upon which the cutter B is secured by means of the nut C.

D is the piece of work in which a groove or channel *a* is to be cut; and in performing work of this kind on a milling-machine as ordinarily constructed it has been the common practice to move the piece of work D in a direction contrary to the movement of the under side of the cutter, as shown by the arrows in Fig. 4; but the action of the cutter when so operated is such as to cause a slight chatter, which results in the production of a comparatively uneven surface, the chips from the cut being liable to interfere with the cutter-teeth in obtaining a proper hold upon the metal in front of the same; but when the piece of work and engaging edge of the cutter are made to move in the same direction, as shown by arrows in Fig. 5, the chips carried over with the teeth of the cutter will not interfere with the production of uniformly smooth work; and, furthermore, in cutting grooves having comparatively thin partitions between them the cutter, when revolved as shown in Fig. 4, would tend to cause the partitions to spread away from the cutter, whereas when revolved as shown in Fig. 5 the thin partitions between the parallel grooves would be kept in true line and in perfect condition, and in order to adapt a milling-machine for the use of a cutter revolving as shown in Fig. 5 it is necessary to hold the table firmly in both directions of its movement without backlash.

The work-supporting table E, as shown in the accompanying drawings, slides in ways provided in the slide-block F, and is provided on its under side with the nut I, which is firmly secured thereto by means of screws *b* or otherwise. A screw G fits into and passes through said nut and has a bearing in one end of the sliding block F. A second nut H is provided on the screw G, and a small space is left between the adjacent faces of the nuts, the last mentioned of which slides free on the under side of the table and is prevented from rotating with the screw by contact with the table and by the bolts *c*, which pass through holes *t* made in the nut I, and are screwed into the nut H, the said bolts carrying the springs *d*, which rest with one end against the nut I and with the other press against the head *c'* of the bolt, thus tending to draw the nut I toward the nut H. By these means opposite pressure is brought to bear upon the threads of the screw, and backlash is consequently prevented, even if the nuts should fit loosely on the screw.

The cutter B is made to revolve in such a direction that its drawing-in action upon the piece of work R will cause the nut I to bear against the same side of the thread of the screw G as that caused by the resilient action of the springs *d*, so that the threads of the nut I and screw G will be held firmly together at that side at all times, so as to prevent backlash.

To the end of the screw G, on the outside of its bearing in the sliding block F, is secured the pinion J, which receives rotary movement through the gear K on the stud S, worm L on the shaft M, back gears N, and cone-pulley O, which is driven from the cone-pulley P on the main spindle Q of the machine, all of these several parts being of well-known construction and elements of the ordinary milling-machine.

In Fig. 2 the cutter B, which is held upon the arbor A, is represented as cutting a groove *g* in a cylindrical bar R, which is held, as usual, upon centers *h h*, firmly attached to the work-supporting table E, the arbor and the cutter being made to revolve in the direction indicated by the arrow shown above the cutter and the piece of work R being fed to the cutter in the direction of the arrow shown under the bar R by means of the proper rotation of the screw G.

It will be readily seen that when the cutter is made to revolve, as above described, in the direction of the feeding movement of the work the cutter will be liable to ride out of the groove $g$, either to the injury of the cutter or to the piece of work, a slight amount of backlash in the movement of the table being sufficient to cause this injurious result; but it will be clearly seen that by means of the spring-actuated nut H, which is arranged to hold the thread of the nut I and screw G firmly together at the proper side to resist the drawing-in tendency of the cutter, the table E can be operated through the whole extent of its movement without backlash, so that the piece of work R, when firmly held upon the table E, will not be liable to be drawn under the cutter by its cutting action upon the forward feeding movement of the table, thus permitting the work to be advantageously performed with the cutter revolving in the direction of the feeding movement of the table, the forwardly-driving action of the screw G being impressed upon the spring-actuated nut H and its backward action upon the positive nut I.

I claim as my invention—

1. The combination, with the cutter and the work-supporting table, of a screw and a positive nut for imparting movement to said table, and a spring-actuated nut so arranged upon said screw and connected with the table that the positive nut will be caused to bear against that side of the thread of the screw which resists the drawing-in tendency of the cutter upon the work, substantially as and for the purpose specified.

2. The combination, with the cutter and the work-supporting table, of the screw and a positively-held nut, which acts as a stop for the forward movement of the table under the action of the cutter, and a spring-actuated nut which is loosely attached to the table and adapted to carry the table forward under the forward driving action of the screw, substantially as described.

ALENZA T. GIFFORD.

Witnesses:
SOCRATES SCHOLFIELD,
JOHN S. LYNCH.